(12) United States Patent
Mauri et al.

(10) Patent No.: US 6,525,913 B1
(45) Date of Patent: Feb. 25, 2003

(54) READ HEAD WITH SUNKEN PREFILL INSULATION FOR PREVENTING LEAD TO SHIELD SHORTS AND MAINTAINING PLANARIZATION

(75) Inventors: Daniele Mauri, San Jose, CA (US); Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 09/635,720

(22) Filed: Aug. 9, 2000

(51) Int. Cl.$^7$ ............................... G11B 5/23; G11B 5/39
(52) U.S. Cl. ........................................................ 360/320
(58) Field of Search ............................. 360/324, 324.1, 360/324.2, 325, 320, 119, 120, 121, 313, 110

(56) References Cited

U.S. PATENT DOCUMENTS

| | | | |
|---|---|---|---|
| 5,568,335 A | * 10/1996 | Fontana et al. | ............. 360/320 |
| 5,867,350 A | 2/1999 | Haga et al. | ................. 360/319 |
| 5,872,689 A | 2/1999 | Gill | ....................... 360/327.31 |
| 5,910,869 A | 6/1999 | Fedeli | ..................... 360/318.1 |
| 6,342,993 B1 | * 1/2002 | Sato | ........................... 360/319 |
| 2001/0033462 A1 | * 10/2001 | Sato | ........................... 360/320 |

* cited by examiner

Primary Examiner—Robert S. Tupper
Assistant Examiner—Julie Anne Watko
(74) Attorney, Agent, or Firm—Paik Saber; Ervin F. Johnston

(57) ABSTRACT

First and second portions of a first shield layer on each side of a planar shield portion below a read sensor are recessed for receiving first and second insulative prefill layers which minimize electrical shorting between first and second hard bias layers and first and second lead layers to the first shield layer. The first and second prefill layers are close to first and second side edges of the read sensor so as to minimize shorting between the layers. By varying the depth of the first and second recesses in the first shield layer the first read gap layer or the second read gap layer can be planarized or, alternatively, each of the first and second read gap layers can be partially planarized, as desired.

22 Claims, 10 Drawing Sheets

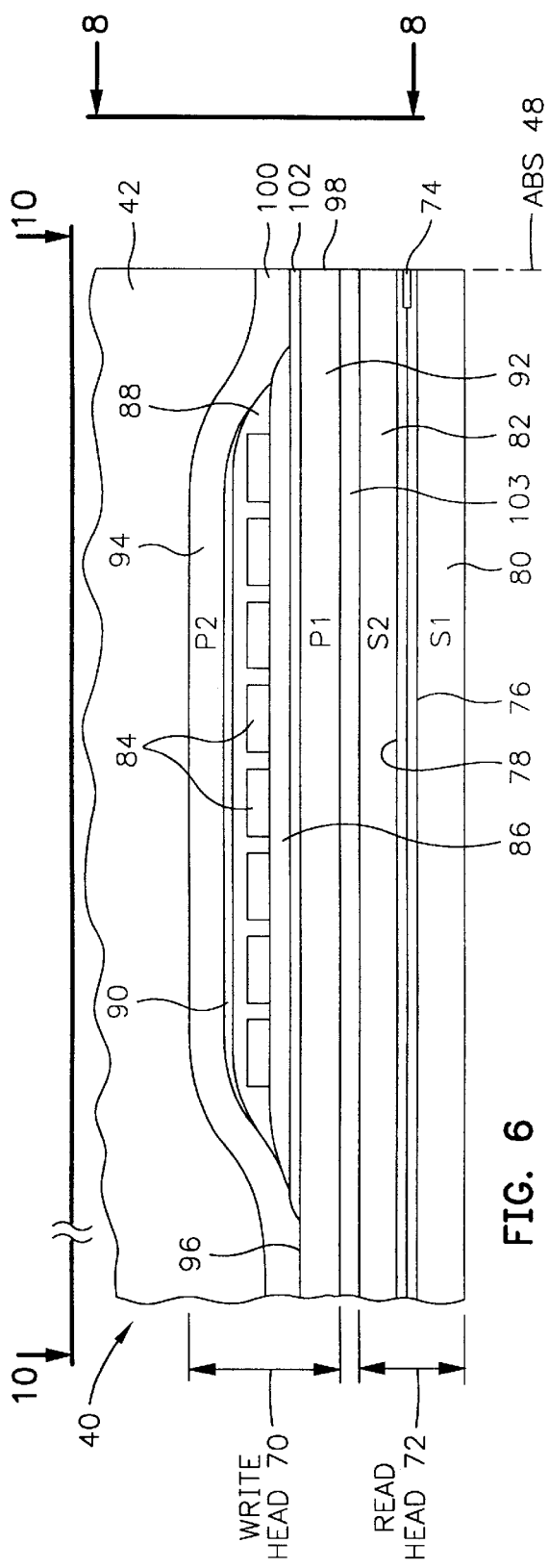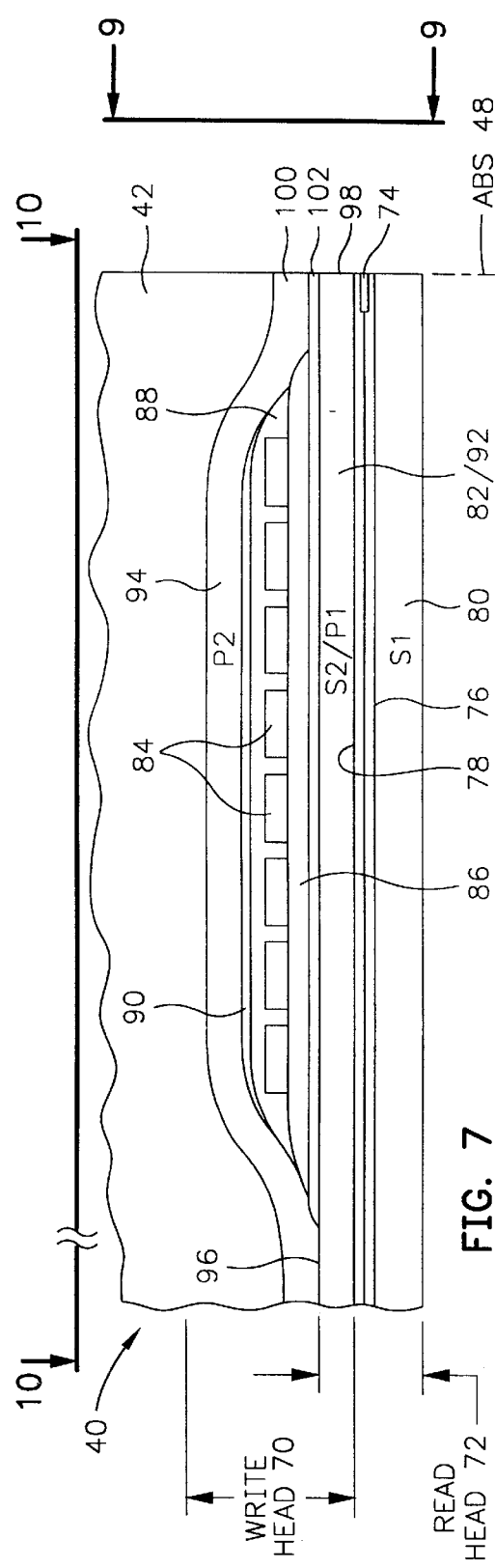

READ HEAD WITH SUNKEN PREFILL INSULATION FOR PREVENTING LEAD TO SHIELD SHORTS AND MAINTAINING PLANARIZATION

BACKGROUND OF THE INVENTION

1. Field of the Invention

The present invention relates to a read head with sunken prefill insulation for preventing lead to shield shorts and maintaining planarization and, more particularly, to first and second prefill insulation layers which are located in first and second recesses in a first shield layer on each side of a read sensor.

2. Description of the Related Art

The heart of a computer is an assembly is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

Magnetic heads are constructed in rows and columns on a wafer by sputter deposition of various material layers and photolithography steps for masking the layers and forming them into desired shapes. In the formation of the read head portion of the magnetic head assembly a first shield layer and a first read gap layer are deposited on the wafer followed by deposition of multiple layers of the read sensor. A bilayer photoresist is then formed to cover all of the MR sensor material layer except for first and second openings located at first and second sites for first and second hard bias and lead layers which are to be connected to first and second edges of the MR sensor. Ion milling is then implemented to remove the sensor material within the first and second openings all the way down to the first read gap layer with a slight overmill of the first read gap layer to ensure that all of the sensor material has been removed. Hard bias material and lead layer material is then sputter deposited after which the bilayer photoresist is removed leaving first and second hard bias and lead layers connected to first and second side edges of a partially completed sensor. These series of steps define the track width of the read head which directly relates to the storage capacity of the rotating magnetic disk which will be discussed in more detail hereinafter.

Next, a bilayer photoresist mask is formed to cover the first and second hard bias and lead layers just deposited as well as the sensor with a back edge of the photoresist defining a location for the back edge of the MR sensor. Ion milling is again implemented which removes all of the sensor material except for the partially completed sensor which now has a defined front and back edge. A second read gap layer and a second shield layer are then formed followed by various sputter deposition steps and photolithography to form the write head. The wafer is then diced into rows of magnetic head assemblies after which each row is lapped to form the air bearing surface (ABS) of each magnetic head in the row. The row of magnetic heads is then diced into individual magnetic head assemblies for mounting on the aforementioned suspension and placement in a magnetic disk drive.

The storage capability of the magnetic disk depends, in part, upon the areal density of the read head which is a product of the track width density and the linear density of the read head. The track width density is expressed as tracks per inch (TPI) along the width of the magnetic disk and linear density is expressed as bits per inch (BPI) along the track of the magnetic disk. There is a strong-felt need to decrease the track width of the read head in order to increase the storage capacity of the. magnetic disk, which can be expressed as gigabits per square inch. For a one gigabit per square inch capacity the track width of the read head should be 0.75 to 0.80 $\mu$m, for a 40 gigabit per square inch capacity the track width of the read head should be 0.35 to 40 $\mu$m and for a 100 gigabit per square inch capacity the track width of the read head should be 0.18 to 0.20 $\mu$m. With a decreased track width it becomes more important to accurately define the location of the first and second hard bias and lead layers at their connection to the MR sensor, as well as forming sharper junctions at these connections. In order to accurately locate the lead to sensor junction with a sharp connection it is important that the first read gap layer be planarized across the wafer so that a light exposure step of the photoresist for patterning is accomplished without shadows which are caused by steps or high profiles of the first read gap layer near the lead to sensor junction sites.

The linear bit density of the read head is determined by the spacing between the first and second shield layers of the read head. This spacing is dependent upon the thicknesses of the first and second read gap layers as well as the thickness of the sensor. A typical thickness of the read sensor is about 400 Å, a typical thickness of the hard bias layer is about 150 Å and a typical thickness of the lead layer is about 600 Å. Accordingly, with a 400 Å thick sensor the first and second hard bias and lead layers will project 350 Å above a top surface of the read sensor on each side of the sensor assuming that the first read gap layer is planar. The higher profile of the first and second hard bias and lead layers on each side of the read sensor requires the second read gap layer be formed on first and second steps with a dip down on the sensor therebetween. When the second read gap layer is sputter deposited onto the wafer the thickness of the second read gap layer portions on the upwardly sloping surfaces of the steps will be less than the second read gap layer portions which are flat on each side of the steps. The thinner second read gap layer portions on the steps increase the risk of pin holes which cause a shorting between the lead layers and the second shield layer. In spite of these problems there is a strong-felt need to reduce the thicknesses of the first and second read gap layers so as to increase the linear bit density of the read head. For a 1 gigabit per square inch capacity a typical thickness of each of the first and second read gap layers is 500 to 600 Å, for a 40 gigabit per square inch capacity a typical thickness of these layers is 150 Å and for a 100 gigabit per square inch capacity a typical thickness of these layers is 10 Å. It should be noted that it is not practical to reduce the thickness of the first and second lead layers because such a reduction will increase a parasitic resistance of the lead layers which competes with the resistance of the sensor.

A prior art teaching for decreasing the thickness of the first read gap layer without the risk of shorts is set forth in commonly assigned U.S. Pat. No. 5,568,335 which is incorporated by reference herein. In this patent first and second prefill insulation layers are deposited on the first shield layer on each side of the MR sensor followed by formation of the first read gap layer. The first and second prefill layers provide extra insulation between the first and second hard bias and lead layers and the first shield layer so as to lower the risk of shorting between the first and second hard bias and lead layers and the first shield layer. However, because of the profile each of the first and second prefill insulation layers they must be kept at least 10 µm away from the side wall sites of the read sensor so that the formation of the first and second hard bias and lead layers at their junctions to the first and second side edges of the MR sensor can be accurately constructed with the aforementioned photolithography step. If the first read gap layer is not planar for a distance on each side of the read sensor the bilayer photoresist employed, for forming the first and second hard bias and lead layers, will have poor coating uniformity when it is spun onto the wafer substrate. This will prevent sharp junctions of the first and second hard bias and lead layers with the first and second side edges of the read sensor as well as poorly defining the size of the read head. A further problem with the prior art prefill design is that the spacing of the prefill insulation layers, in the order of 10 µm, from the side edges of the read sensor increases the risk of shorting between the first and second hard bias and lead layers and the first shield layer, since only the first read gap layer is located within these locations. As previously mentioned, the first read gap layer is slightly overmilled on each side of the read sensor which further thins the first read gap layer in these locations.

Accordingly, there is a strong-felt need to reduce the thicknesses of each of the first and second read gap layers for promoting linear bit read density without increasing the risk of shorts between the first and second hard bias and lead layers and the first and second shield layers.

SUMMARY OF THE INVENTION

I have provided first and second prefill insulation layers which can be located below the first read gap layer for increasing insulation between the first and second hard bias and lead layers and the first shield layer to minimize the risk of shorting without impacting the photolithography step which is employed for defining the first and second hard bias and lead layers and their junctions with the first and second side edges of the read sensor. This has been accomplished by providing first and second recesses in the first shield layer which receive the first and second prefill layers so that top surfaces of the prefill layers can be lowered to completely eliminate their profile or, optionally, partially eliminate their profile, as desired. In the invention the read sensor is located above an unmilled planar portion of the first shield layer and the first shield layer is ion milled on each side of the read sensor to form the first and second recesses. In a first embodiment of the invention, the first and second recesses are sufficiently deep so that the first and second prefill layers sputter deposited therein become planar with the planar portion of the first shield layer directly below the read sensor. Accordingly, when the first read gap layer is sputter deposited, the first read gap layer will be planar across the wafer. This then permits an optimized photolithography step in forming the first and second hard bias and lead layers and their junctions to the first and second side edges of the MR sensor without the aforementioned shadowing. The first and second prefill layers can now be fabricated much closer to the first and second side edges of the MR sensor so as to minimize shorting between the first and second hard bias and lead layers and the first shield layer.

It should be noted that in the first embodiment there has been no relief for the shorting problem of the second read gap layer as it extends over the first and second steps caused by the high profiles of the first and second hard bias and lead layers adjacent the read sensor. The invention, however, may be employed for partially eliminating this problem or completely eliminating this problem, as desired. In a second embodiment of the invention the first and second recesses in the first shield layer are deeper than the first and second recesses in the first embodiment so that the first and second prefill layers are recessed below the planar portion of the first shield layer. This then permits a portion of the first and second hard bias and lead layers to be recessed within the first and second recesses in the first shield layer so as to reduce the first and second steps caused by the first and second hard bias and lead layers above the read sensor. It should be understood, however, that the second embodiment will have some impact on the photolithography step which defines the first and second hard bias and lead layers and their junctions with the read sensor, since there is a down step on each side of the read sensor after sputter depositing the first read gap layer.

In a third embodiment the first and second recesses in the first shield layer are still deeper than the recesses in the second embodiment to the point where the first and second hard bias and lead layers are sufficiently recessed in the first and second recesses that the second read gap layer is substantially planar across the top of the first and second hard bias and lead layers and the read sensor. Since the second read gap layer is substantially flat and has not climbed any steps its thickness will be substantially uniform so that shorting between the first and second hard bias and lead layers to the second shield layer is minimized.

An object of the present invention is to provide first and second prefill insulation layers below the first read gap layer and on each side of the read sensor for minimizing risk of shorts between the first and second hard bias and lead layers and the first shield layer all the way to locations adjacent the first and second side edges of the read sensor without impacting a photolithography step for defining the first and second hard bias and lead layers and their junctions to first and second side edges of the read sensor.

Another object is to provide first and second prefill insulation layers below the first read gap layer which can be employed for reducing the thickness of the first read gap layer and/or the second read gap layer.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
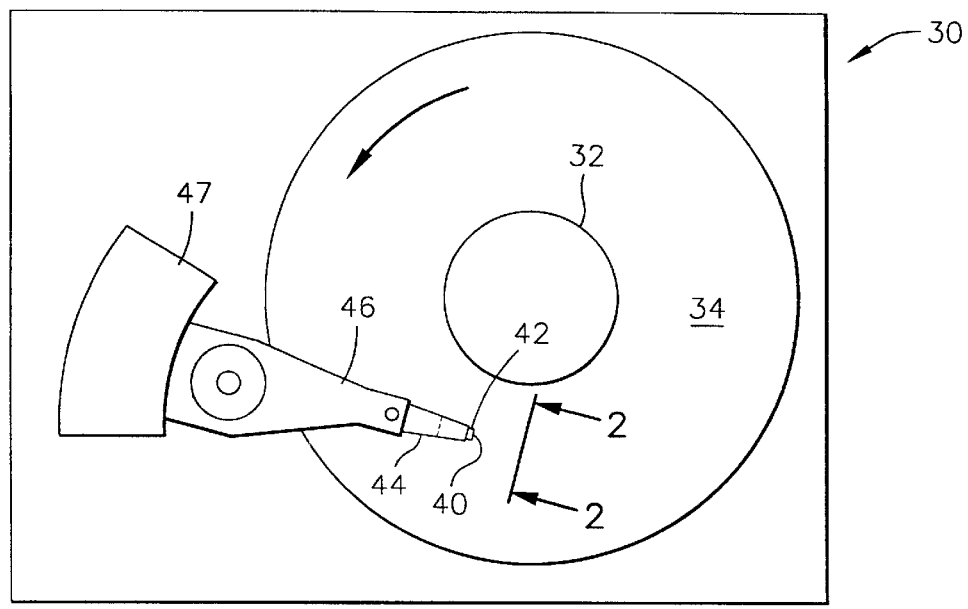
FIG. 1 is a plan view of an exemplary magnetic disk drive.
Figure 2:
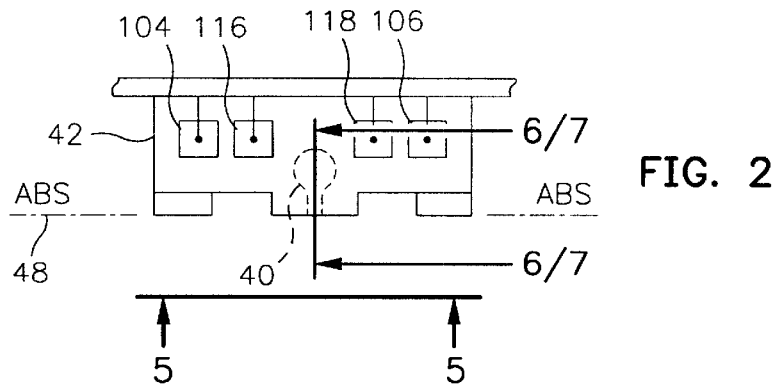
FIG. 2 is an end view of a slider with a magnetic head of the disk drive as seen in plane 2—2 of FIG. 1.
Figure 3:
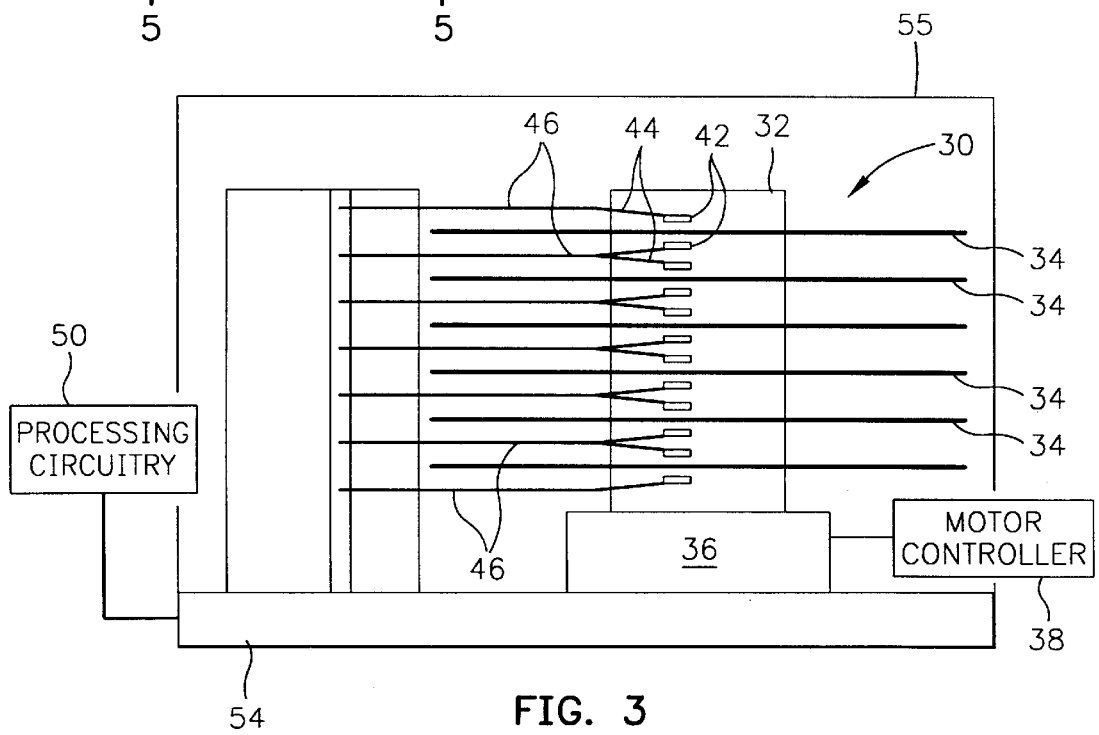
FIG. 3 is an elevation view of the magnetic disk drive wherein multiple disks and magnetic heads are employed.
Figure 4:
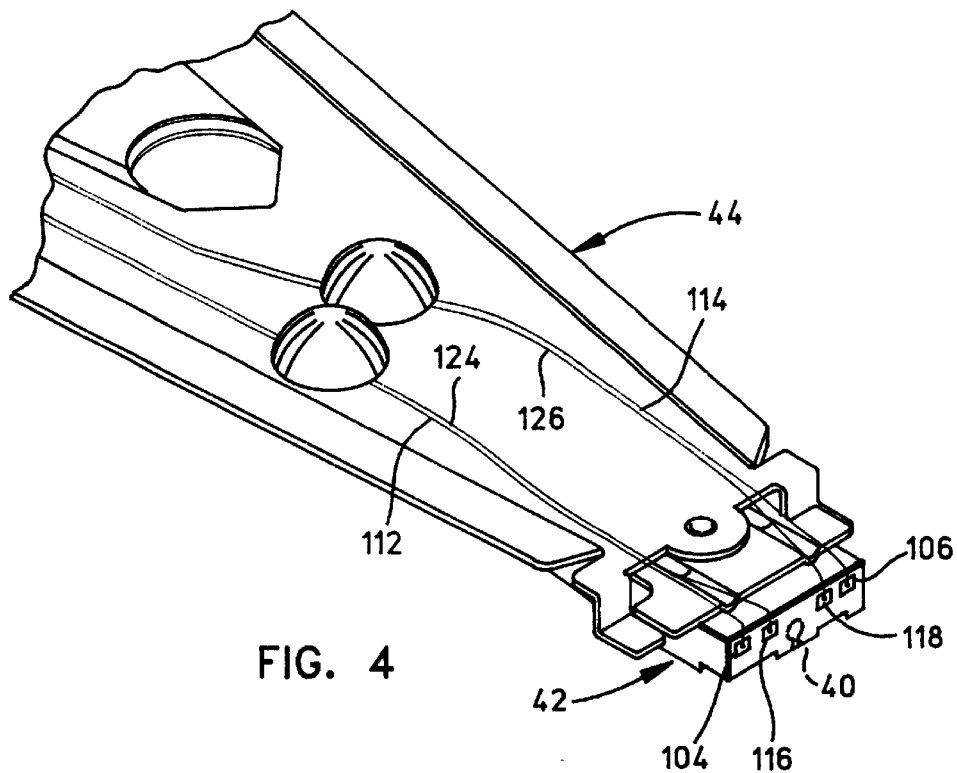
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
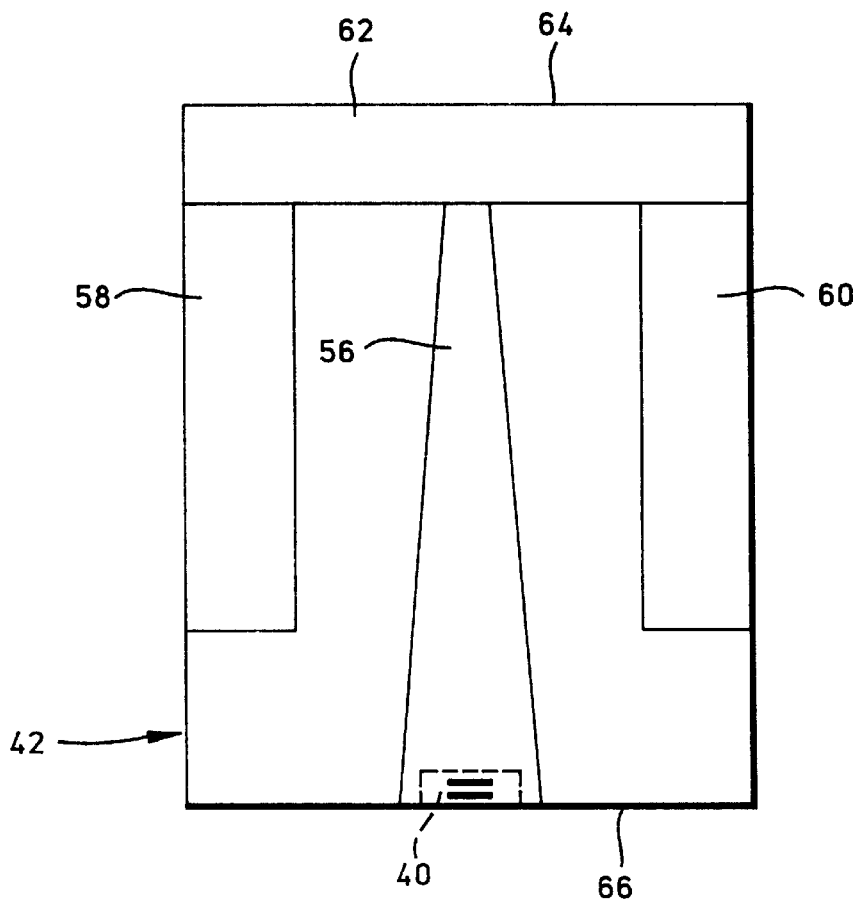
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
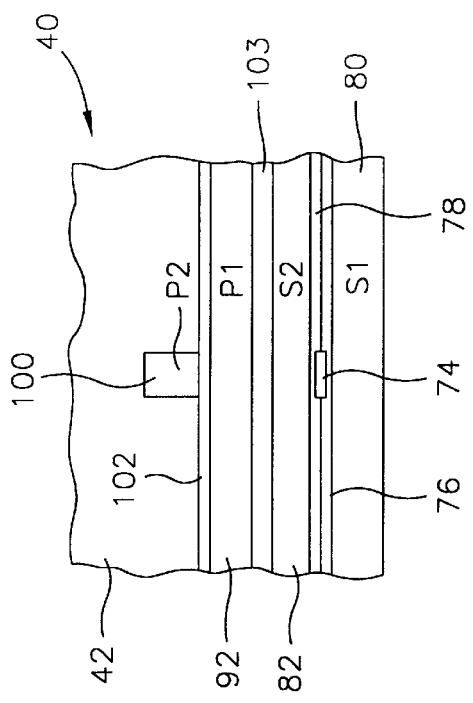
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
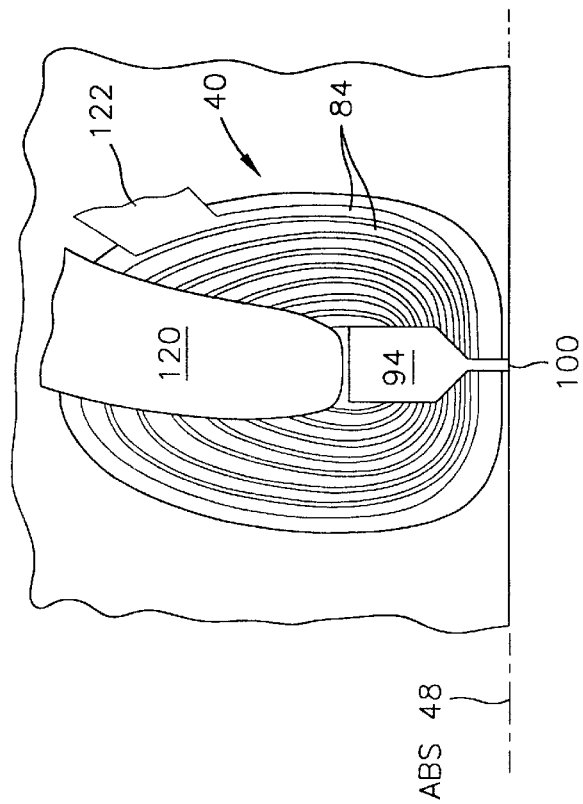
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
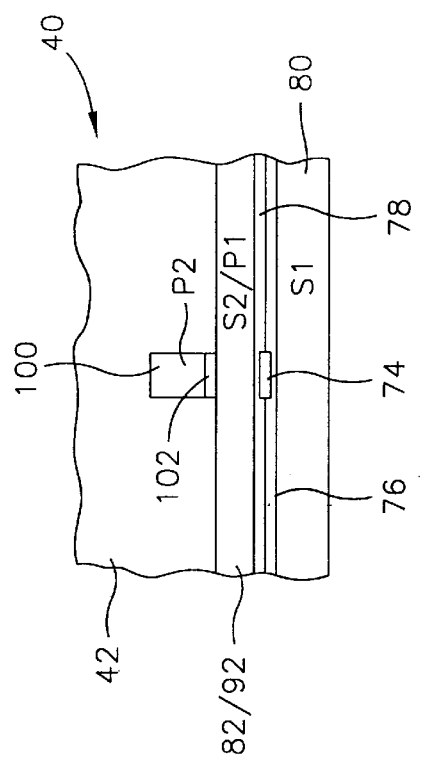
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
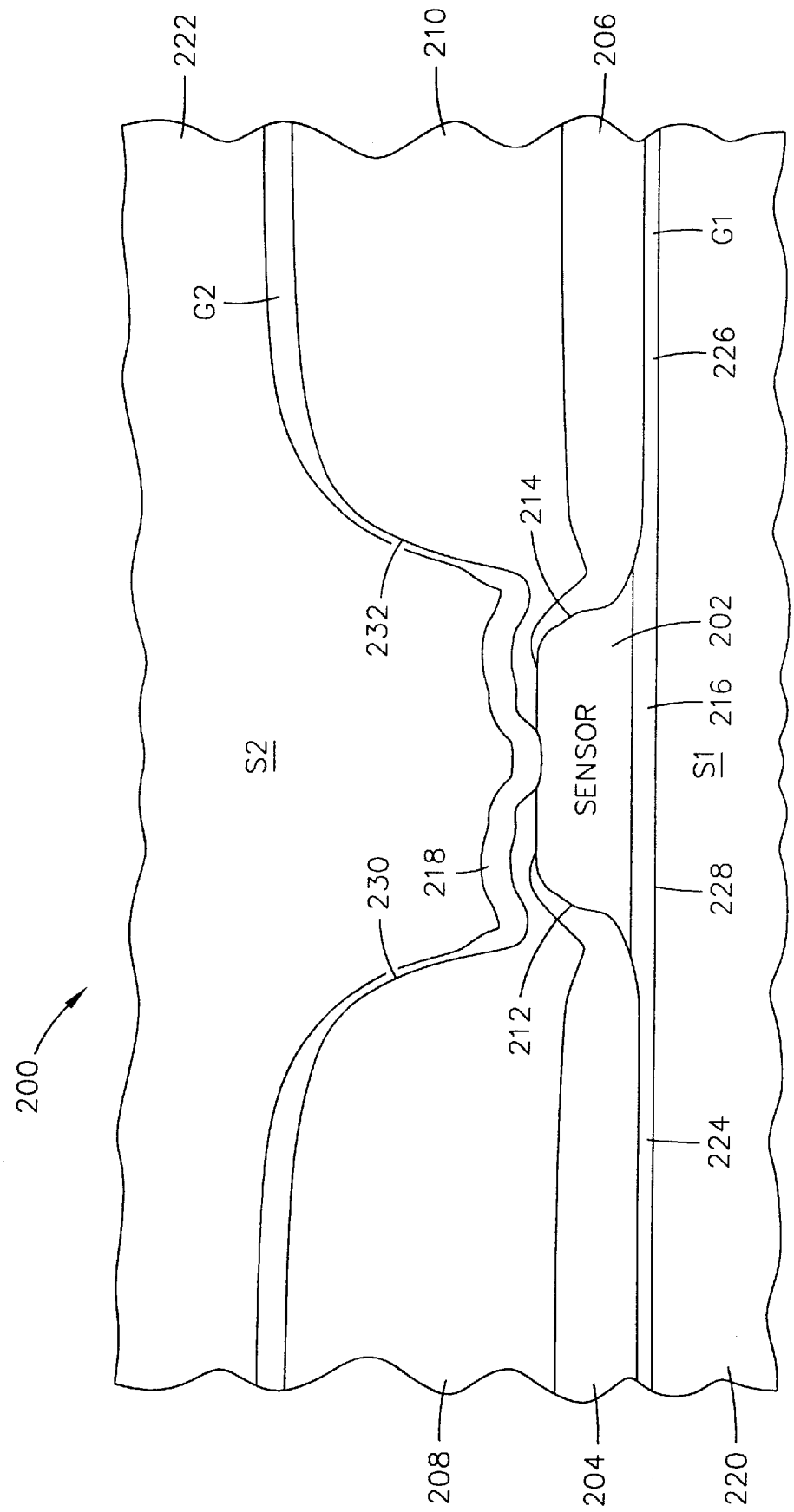
FIG. 11 is an ABS illustration of a first prior art read head.

An ABS illustration of a prior art read head 200 is illustrated in FIG. 11. The read head 200 includes a read sensor 202 which may be an anisotropic magneto-resistive (AMR) sensor or a spin valve (SV) sensor, as desired. First and second hard bias layers 204 and 206 and first and second lead layers 208 and 210 are connected to first and second side edges 212 and 214 of the read sensor. This is known in the art as a contiguous junction which is fully described in commonly assigned U.S. Pat. No. 5,018,037 which is incorporated by reference herein. The read sensor 202, the first and second hard bias layers 204 and 206 and the first and second lead layers 208 and 210 are located between nonmagnetic insulative first and second read gap layers (G1) and (G2) 216 and 218. The first and second read gap layers 216 and 218 are, in turn, located between ferromagnetic first and second shield layers (S1) and (S2) 220 and 222.

A step in the construction of the read head 700 in FIG. 11 is to sputter deposit a read sensor material layer over an entire wafer (not shown). A bilayer photoresist mask (not shown) is then formed on top of a read sensor site, as shown at 202 in FIG. 11, with openings where the first and second hard bias layers 204 and the first and second lead layers 208 and 210 are to be formed after ion milling the exposed read sensor material. Hard bias and lead layer material is then sputter deposited on the wafer and the bilayer photoresist is lifted off by dissolving a first layer of the bilayer leaving the first and second hard bias layers 204 and 206 and the first and second lead layers 208 and 210 connected to the read sensor 202, as shown in FIG. 11. These steps are explained in U.S. Pat. Nos. 5,568,335 and 5,018,037. It should be noted that the portions 224 and 226 of the first read gap layer are thinner than a middle portion 228 located therebetween. This is because before depositing the hard bias and lead layer materials the sensor material in the aforementioned openings was ion milled away with a slight overmill to ensure its complete removal. Unfortunately, the thinner portions 224 and 226 increase the risk of pin holes in these portions which can result in a shorting between the hard bias and lead layers to the first shield layer 220. In order to overcome this problem the first read gap layer 216 has to be thick enough to allow for overmilling so that the final thickness of the layer portions 224 and 226 are sufficiently thick to substantially remove the risk of pin holes and shorting between the components. Unfortunately, this extra thickness thickens the middle portion 228 which decreases the linear read bit density of the read head because the spacing between the first and second shield layers 220 and 222 has been increased.

It should be noted that the profile of the first and second hard bias layers 204 and 206 and the first and second lead layers 208 and 210 is significantly greater than the profile of the read sensor 202 which causes pronounced first and second steps 230 and 232. Unfortunately, when the second read gap layer 218 is sputter deposited on the wafer the portions of the read gap layer at 230 and 232 are significantly less thick than other portions of the read gap layer. This then increases the risk of pin holes in the read gap layer portions at 230 and 232 which can cause shorting between the first and second lead layers 208 and 210 and the second shield layer 222. Again, when the second read gap layer 218 is made sufficiently thick to minimize the possibility of pin holes at the steps 230 and 232, this increases the thickness of the second read gap layer immediately above the read sensor 202 which will lower the linear read bit density resolution of the read head. Accordingly, there is a strong-felt need to increase the insulation between the first and second lead layers 208 and 210 and the first and second shield layers 220 and 222 without impacting the linear read bit density resolution of the read head.

Figure 12:
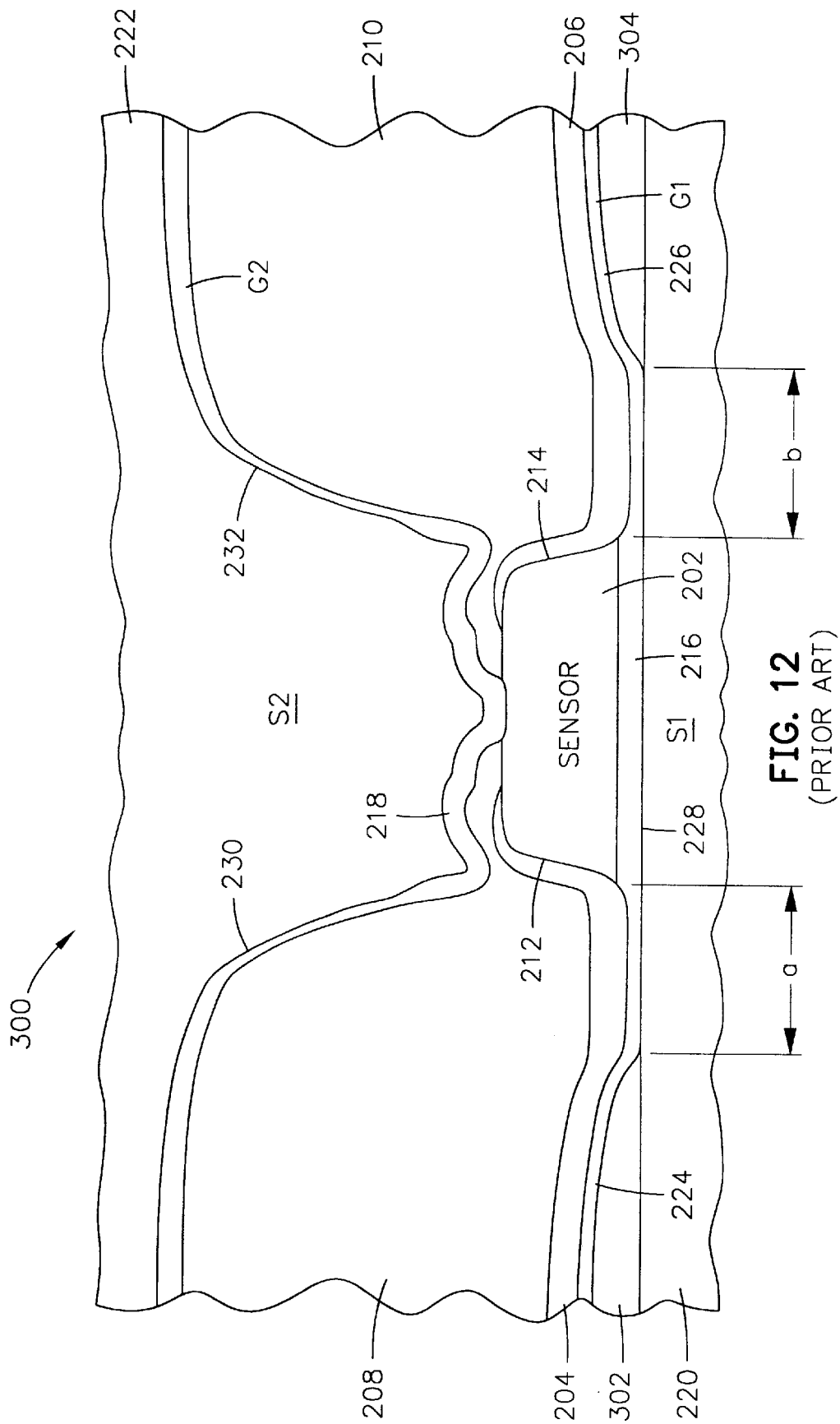
FIG. 12 is an ABS illustration of a second prior art read head.

Another prior art embodiment 300 of a read head (U.S. Pat. No. 5,568,335) is illustrated in FIG. 12. The embodiment 300 is the same as the embodiment 200 in FIG. 11 except for nonmagnetic insulative first and second prefill layers 302 and 304 which are located between the first shield layer 220 and the first read gap layer 216 and, more specifically, between the first shield layer 220 and the thinned down portions 224 and 226 of the first read gap layer. The prefill layers 302 and 304 provide extra insulation between the first shield layer 220 and the first and second hard bias layers 204 and 206 which is necessary to minimize pin holes and shorting between these layers. Unfortunately, however, the first and second prefill layers 302 and 304 must be laterally spaced from the side edges 212 and 214 of the read sensor, as shown by spaces a and b. The spacing is necessary because the aforementioned bilayer photoresist must be flat in the area where the side edges 230 and 232 of the read sensor are to be formed. If the prefill layers 302 and 304 are closer to the side edges 212 and 214 the bilayer photoresist will have an upward slope adjacent the first and second edge sites 212 and 214. When a light exposure step is employed for exposing portions of the bilayer photoresist which are to be removed for the first and second hard bias and first and second lead layers, the upward slope of the bilayer photoresist adjacent the side edge sites 212 and 214 will cause shadowing which will impact the location and the shape of the first and second edges 212 and 214. Further, the steps 302 and 304 will also cause resist coating nonuniformity which, in turn, will cause bad line width (size) uniformity across the wafer. Since the first and second prefills 302 and 304 cannot be located very close to the first and second side edges 212 and 214, there is a risk of pin holes in the first read gap layer which extends along the spaces a and b which increases the potential of shorting between the first and second hard bias layers 204 and 206 and the first and second lead layers 208 and 210 to the first shield layer 220.

The Invention

Figure 13:
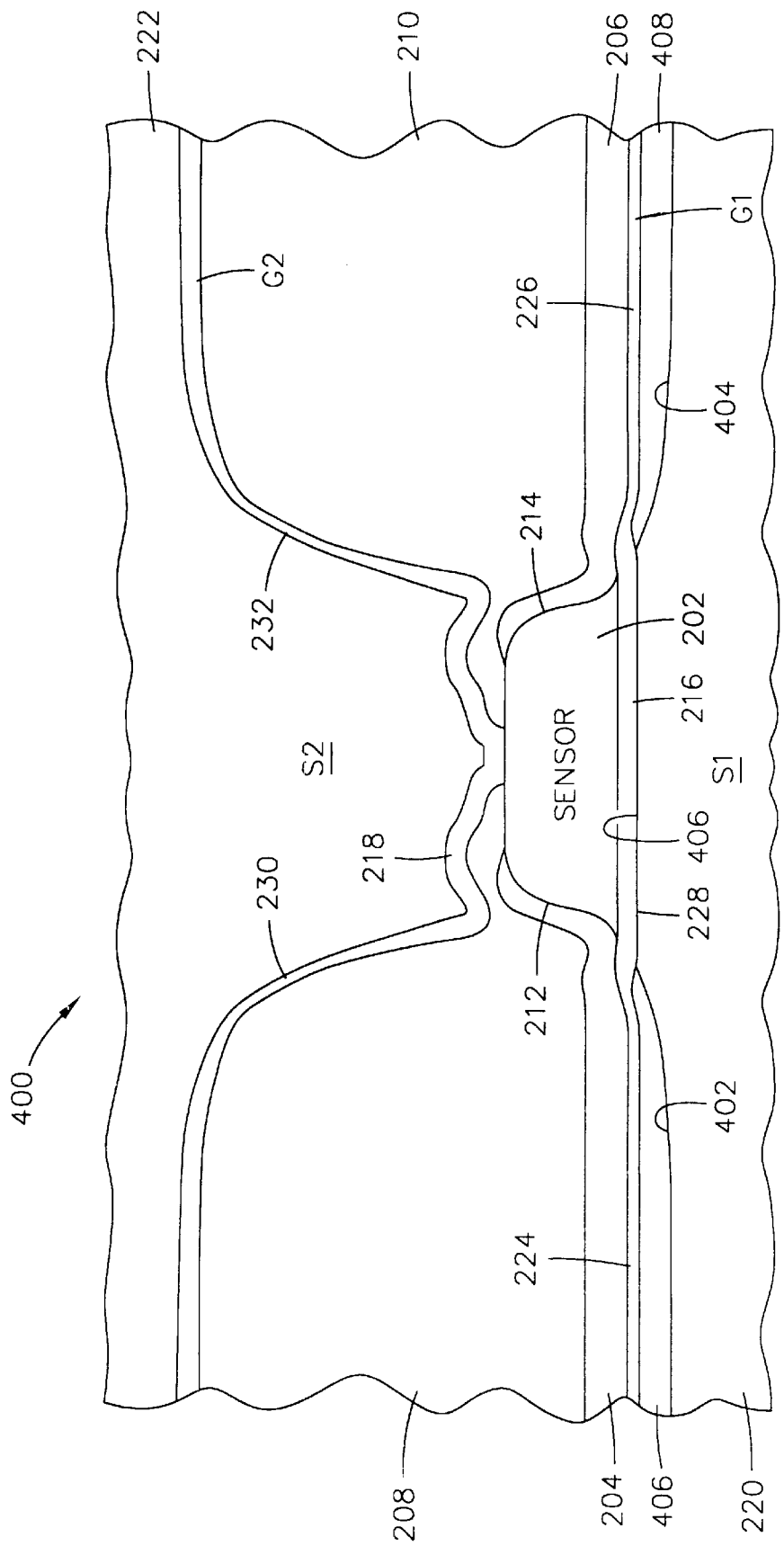
FIG. 13 is an ABS illustration of a first embodiment of the present read head.

An ABS illustration of a first embodiment of the present read head 400 is illustrated in FIG. 13. This read head is the same as the read head 200 in FIG. 11 except the first shield layer 220 has first and second recesses 402 and 404 which accommodate first and second prefill layers 406 and 408. It should be noted that the first and second prefill layers 406 and 408 are substantially adjacent the first and second side edges 212 and 214 of the read sensor. This means that the risk of shorting along the first read gap layer at spaces a and b in FIG. 12 has been obviated. The prefill layers 406 and 408 may be formed by first forming a bilayer photoresist (not shown) on a planar shield portion 406 and ion milling the first and second recesses 402 and 404 to a desired depth. A prefill material layer is then sputter deposited after which the bilayer photoresist is lifted off leaving the first and second prefill layers 406 and 408 with the planar shield portion 406 located therebetween. The read head 400 is the preferred embodiment of the present invention since, with the first and second prefill layers 406 and 408 recessed or sunken, the second read gap layer 216 is planar which promotes a highly defined and accurately, placed read sensor 202 when it is constructed with the aforementioned photoresist step. It should be noted, however, that this has not corrected the problem of the thinned down portions of the second read gap layer 218 at the first and second steps 230 and 232.

Figure 14:
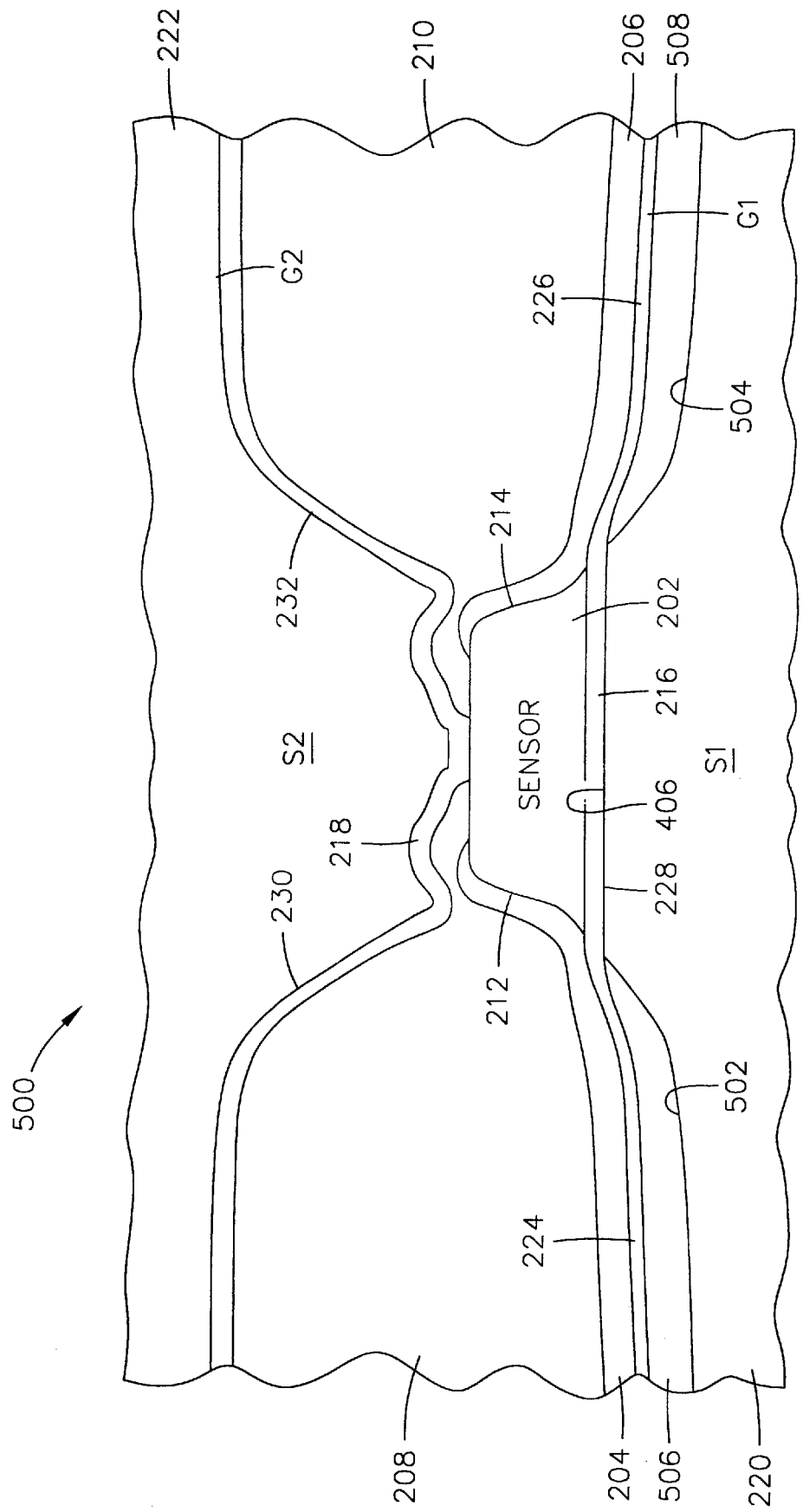
FIG. 14 is an ABS illustration of a second embodiment of the present read head.

A second embodiment of the present read head 500 is illustrated in FIG. 14 which is the same as the embodiment 400 shown in FIG. 13 except for first and second recesses 502 and 504 and first and second prefill layers 506 and 508. The first and second recesses 502 and 504 are deeper than the first and second recesses 402 and 404 in FIG. 13, which causes the first and second prefill layers 506 and 508 to be located below the planar shield portion 406. This causes the first read gap layer 216 to be slightly recessed on each side of the read sensor 202 which will slightly impact the photoresist step which forms the first and second side edges 212 and 214 of the read sensor. By slightly recessing the first and second portions of the first read gap layer 216 on each side of the read sensor 202, below the plane 406, the steps at 230 and 232 will be slightly less which will cause less thinning of the second read gap layer 218 along these steps.

Figure 15:
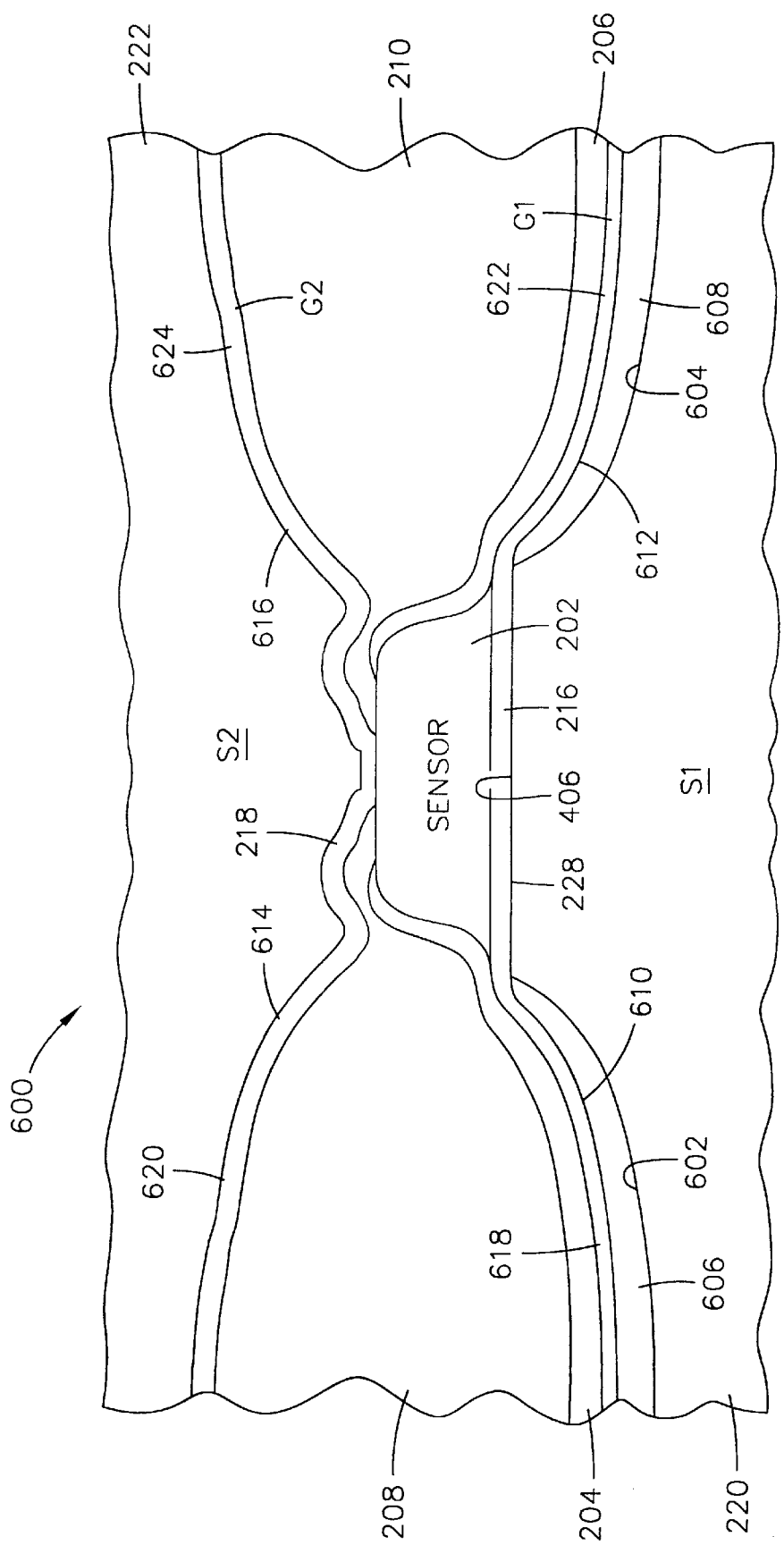
FIG. 15 is an ABS illustration of a third embodiment of the present read head.

FIG. 15 shows a third embodiment 600 of the present read head which is the same as the read head 500 in FIG. 14, except for first and second recesses 602 and 604 in the first shield layer, and first and second prefill layers 606 and 608 disposed therein. The recesses 602 and 604 are deeper than the recesses 502 and 504 in FIG. 14 by a sufficient amount to cause the first read gap layer 216 to have first and second steps 610 and 612 below a bottom plane of the read sensor 202 to be substantially equal to first and second steps 614 and 616 of the second read gap layer above the top plane of the read sensor. Another way of stating this is that the thickness of the first prefill layer 606, a first portion 618 of the first read gap layer, the first hard bias layer 204 and a first portion of the first lead layer below the bottom plane of the read sensor 202 is substantially equal to a thickness of a second portion of the first lead layer and a first portion 620 of the second read gap layer above a top plane of the read sensor 202. The same is true for the other side of the read sensor wherein a thickness of the second prefill layer 608, a second portion 622 of the first read gap layer, the second hard bias layer 206 and a first portion of the second lead layer below the bottom plane of the read sensor 202 is substantially equal to a thickness of a second portion of the second lead layer and a second portion 624 of the second read gap layer above the top plane of the read sensor 202. With this arrangement the steps that the first and second read gap layers 216 and 218 take over steps below and above the read sensor 202 are substantially equal which will substantially equalize and minimize the thinning of these read gap layers at these steps so as to reduce shorting between the hard bias and lead layers and the first and second shield layers. This will then optimize the total thickness of the first and second read gap layers below and above the read sensor 202 so as to promote the linear read bit density resolution of the read head.

Figure 16:
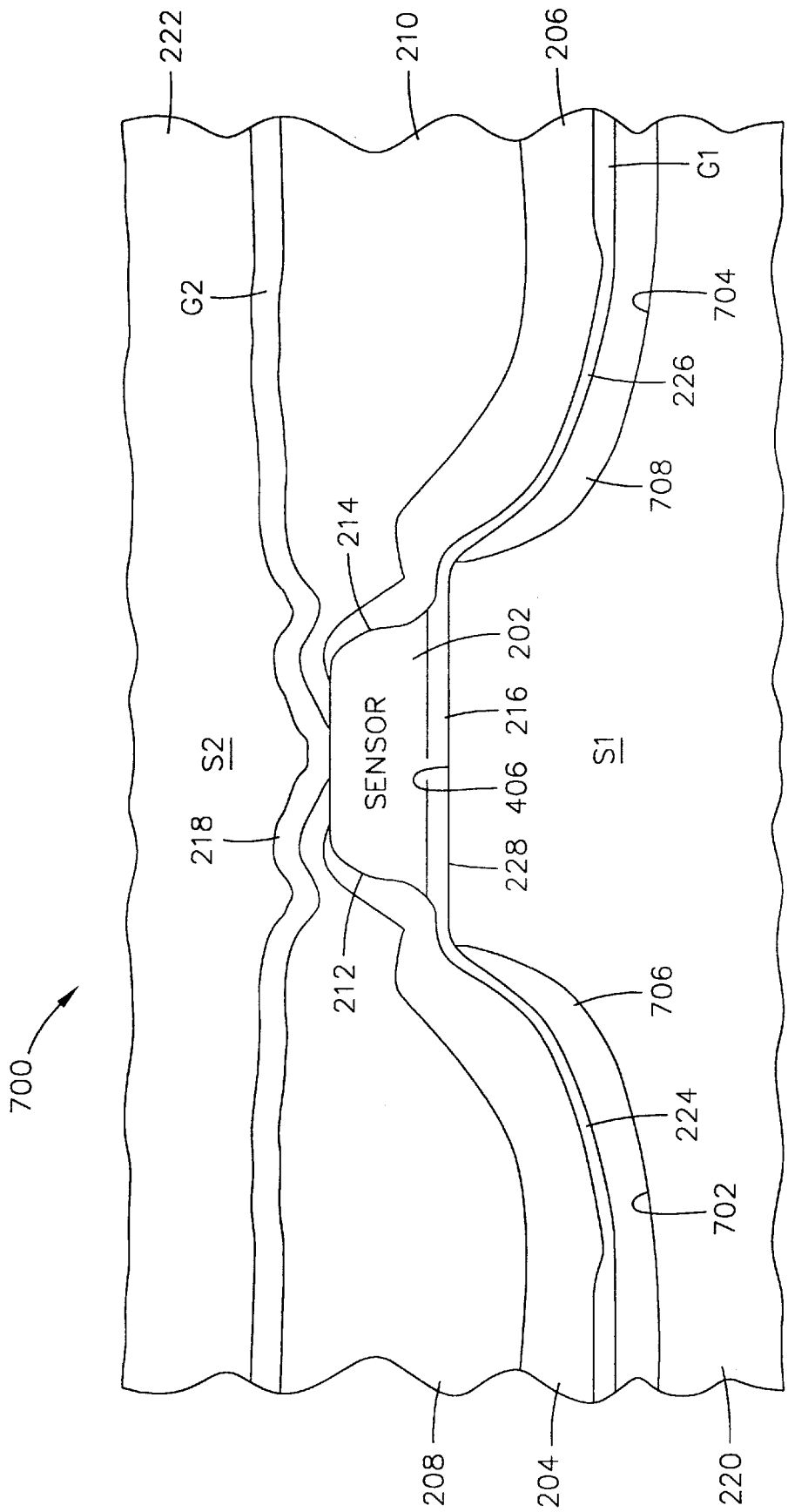
FIG. 16 is an ABS illustration of a fourth embodiment of the present read head.

A fourth embodiment 700 of the present read head is illustrated in FIG. 16 which is the same as the embodiment 600 in FIG. 15 except for the first shield recesses 702 and 704 and the first and second prefill layers 706 and 708. The first and second shield recesses 702 and 704, which are deeper than the shield recesses 602 and 604 in FIG. 15, are sufficiently deep so that the second read gap layer 218 is substantially planarized as it extends across the first lead layer 208, the top of the read sensor 202 and the second lead layer 210. Accordingly, with the present invention the second read gap layer 218 can be constructed with a minimum thickness to minimize the risk of pin holes on the flat portions which permits the second read gap portion on top of the read sensor 202 to be a minimum thickness for promoting maximum linear read bit density of the read head. While the first read gap layer 216 has some thinning on the sloping portions of the first and second prefill layers 706 and 708, it should be noted that the first and second prefill layers will provide the extra insulation that is required for preventing shorting between the first and second hard bias layers 204 and 206 and the first and second lead layers 208 and 210 to the first shield layer 220. While this embodiment causes some sloping of the bilayer photoresist which constructs the read sensor 202, the slope is in such a direction that it will not seriously impact the light exposure step of the bilayer photoresist.

Discussion

The first and second prefill layers are preferably alumina (Al$_2$O$_3$) or silicon dioxide (Si$_2$O$_3$). The first and second read gap layers are preferably alumina (Al$_2$O$_3$), the first and second hard bias layers 204 and 206 may be nickel iron chromium (NiFeCr), the first and second leads 208 and 210 may be copper (Cu), gold (Au), tungsten (W) or tantalum (Ta) and the first and second shield layers 220 and 222 may be nickel iron (NiFe). Subsequent to construction of the read head the write head is constructed thereon as either a merged head or a piggyback head, as shown in FIGS. 6 and 7, respectively.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic read head assembly comprising:
   a slider;
   a magnetic read head located on the slider;
   the magnetic read head including:
   nonmagnetic insulative first and second read gap layers;
   a read sensor;
   first and second hard bias layers and first and second lead layers connected to the read sensor;
   the read sensor, the first and second hard bias layers and the first and second lead layers being located between the first and second read gap layers;
   ferromagnetic first and second shield layers;
   the first and second read gap layers being located between the first and second shield layers;
   the first shield layer having a planar shield portion and first and second recessed shield portions with the planar shield portion located between the first and second recessed shield portions and wherein the planar shield portion is substantially flat and the first and second recessed portions are recessed with respect to the planar shield portion;
   the read sensor further being located between the planar shield portion of the first shield layer and the second shield layer;
   nonmagnetic insulative fist and second prefill layers with the first prefill layer being located in the first recessed shield portion and the second prefill layer being located in the second recessed shield portion;
   the first read gap layer being located on the planar shield portion and the first and second prefill layers; and
   the first shield layer being closer to the slider than the second shield layer.

2. A magnetic read head as claimed in claim 1 wherein each of the first and second prefill layers is coplanar with the planar shield portion of the first shield layer.

3. A magnetic read head as claimed in claim 1 wherein a top surface of each of the first and second prefill layers is recessed a distance relative to the planar shield portion of the first shield layer.

4. A magnetic read head as claimed in claim 3 wherein the recessed shield portions are sufficiently recessed relative to the planar shield portion of the first shield layer so that the first read gap layer has first and second steps below a bottom plane of the read sensor that are substantially equal to first and second steps respectively of the second read gap layer above a top plane of the read sensor.

5. A magnetic read head as claimed in claim 3 wherein a thickness of the first prefill layer, a first portion of the first read gap layer, the first hard bias layer and a first portion of the first lead layer below a bottom plane of the read sensor is substantially equal to a thickness of a second portion of the first lead layer and a first portion of the second read gap layer above a top plane of the read sensor, and a thickness of the second prefill layer, a second portion of the first read gap layer, the second hard bias layer and a first portion of the second lead layer below a bottom plane of the read sensor is substantially equal to a thickness of a second portion of the second lead layer and a second portion of the second read gap layer above a top plane of the read sensor.

6. A magnetic read head as claimed in claim 3 wherein each of the first and second recessed shield portions is recessed a sufficient distance relative to the planar shield portion of the first shield layer so that the second read gap layer is substantially planarized as it extends across the first lead layer, the sensor and the second lead layer.

7. A magnetic head assembly comprising:
   a write head including:
   ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions;

a read head including:

nonmagnetic insulative first and second read gap layers;

a read sensor;

first and second hard bias layers and first and second lead layers connected to the read sensor;

the read sensor, the first and second hard bias layers and the first and second lead layers being located between the first and second read gap layers; ferromagnetic first and second shield layers;

the first and second read gap layers being located between the first and second shield layers;

the first shield layer having a planar shield portion and first and second recessed shield portions with the planar shield portion located between the first and second recessed shield portions and wherein the planar shield portion is substantially flat and the first and second recessed portions are recessed with respect to the planar shield portion;

the read sensor further being located between the planar shield portion of the first shield layer and the second shield layer;

nonmagnetic insulative first and second prefill layers with the first prefill layer being located in the first recessed shield portion and the second prefill layer being located in the second recessed shield portion;

the first read gap layer being located on the planar shield portion and the first and second prefill layers; and the second shield layer being closer to the write head than the first shield layer.

8. A magnetic head assembly as claimed in claim 7 wherein the second shield layer and the first pole piece layer are a common layer.

9. A magnetic head assembly as claimed in claim 7 including a nonmagnetic insulative isolation layer between the second shield layer and the first pole piece layer.

10. A magnetic head assembly as claimed in claim 7 wherein each of the first and second prefill layers is coplanar with the planar shield portion of the first shield layer.

11. A magnetic head assembly as claimed in claim 7 wherein a top surface of each of the first and second prefill layers is recessed a distance relative to the planar shield portion of the first shield layer.

12. A magnetic head assembly as claimed in claim 11 wherein the recessed shield portions are sufficiently recessed relative to the planar shield portion of the first shield layer so that the first read gap layer has first and second steps below a bottom plane of the read sensor that are substantially equal to first and second steps respectively of the second read gap layer above a top plane of the read sensor.

13. A magnetic head assembly as claimed in claim 11 wherein a thickness of the first prefill layer, a first portion of the first read gap layer, the first hard bias layer and a first portion of the first lead layer below a bottom plane of the read sensor is substantially equal to a thickness of a second portion of the first lead layer and a first portion of the second read gap layer above a top plane of the read sensor, and a thickness of the second prefill layer, a second portion of the first read gap layer, the second hard bias layer and a first portion of the second lead layer below a bottom plane of the read sensor is substantially equal to a thickness of a second portion of the second lead layer and a second portion of the second read gap layer above a top plane of the read sensor.

14. A magnetic head assembly as claimed in claim 11 wherein each of the first and second recessed shield portions is recessed a sufficient distance relative to the planar shield portion of the first shield layer so that the second read gap layer is substantially planarized as it extends across the first lead layer, the sensor and the second lead layer.

15. A magnetic disk drive comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions;

a read head including:

nonmagnetic insulative first and second read gap layers;

a read sensor;

first and second hard bias layers and first and second lead layers connected to the read sensor;

the read sensor, the first and second hard bias layers and the first and second lead layers being located between the first and second read gap layers;

ferromagnetic first and second shield layers;

the first and second read gap layers being located between the first and second shield layers;

the first shield layer having a planar shield portion and first and second recessed shield portions with the planar shield portion located between the first and second recessed shield portions and wherein the planar shield portion is substantially flat and the first and second recessed portions are recessed with respect to the planar shield portion;

the read sensor further being located between the planar shield portion of the first shield layer and the second shield layer;

nonmagnetic insulative first and second prefill layers with the first prefill layer being located in the first recessed shield portion and the second prefill layer being located in the second recessed shield portion;

the first read gap layer being located on the planar shield portion and the first and second prefill layers; and the second shield layer being closer to the write head than the first shield layer;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head to multiple positions with respect to said magnetic disk; and a processor connected to the magnetic head, to the spindle motor and to the actuator for exchanging signals with the magnetic head, for controlling movement of the magnetic disk and for controlling the position of the magnetic head.

16. A magnetic disk drive as claimed in claim 15 wherein the second shield layer and the first pole piece layer are a common layer.

17. A magnetic disk drive as claimed in claim 15 including a nonmagnetic insulative isolation layer between the second shield layer and the first pole piece layer.

18. A magnetic disk drive as claimed in claim 15 wherein each of the first and second prefill layers is coplanar with the planar shield portion of the first shield layer.

19. A magnetic disk drive as claimed in claim 15 wherein a top surface of each of the first and second prefill layers is recessed a distance relative to the planar shield portion of the first shield layer.

20. A magnetic disk drive as claimed in claim 19 wherein the recessed shield portions are sufficiently recessed relative to the planar shield portion of the first shield layer so that the first read gap layer has first and second steps below a bottom plane of the read sensor that are substantially equal to first and second steps respectively of the second read gap layer above a top plane of the read sensor.

21. A magnetic disk drive as claimed in claim 19 wherein a thickness of the first prefill layer, a first portion of the first read gap layer, the first hard bias layer and a first portion of the first lead layer below a bottom plane of the read sensor is substantially equal to a thickness of a second portion of the first lead layer and a first portion of the second read gap layer above a top plane of the read sensor, and a thickness of the second prefill layer, a second portion of the first read gap layer, the second hard bias layer and a first portion of the second lead layer below a bottom plane of the read sensor is substantially equal to a thickness of a second portion of the second lead layer and a second portion of the second read gap layer above a top plane of the read sensor.

22. A magnetic disk drive as claimed in claim 19 wherein each of the first and second recessed shield portions is recessed a sufficient distance relative to the planar shield portion of the first shield layer so that the second read gap layer is substantially planarized as it extends across the first lead layer, the sensor and the second lead layer.

* * * * *